UNITED STATES PATENT OFFICE.

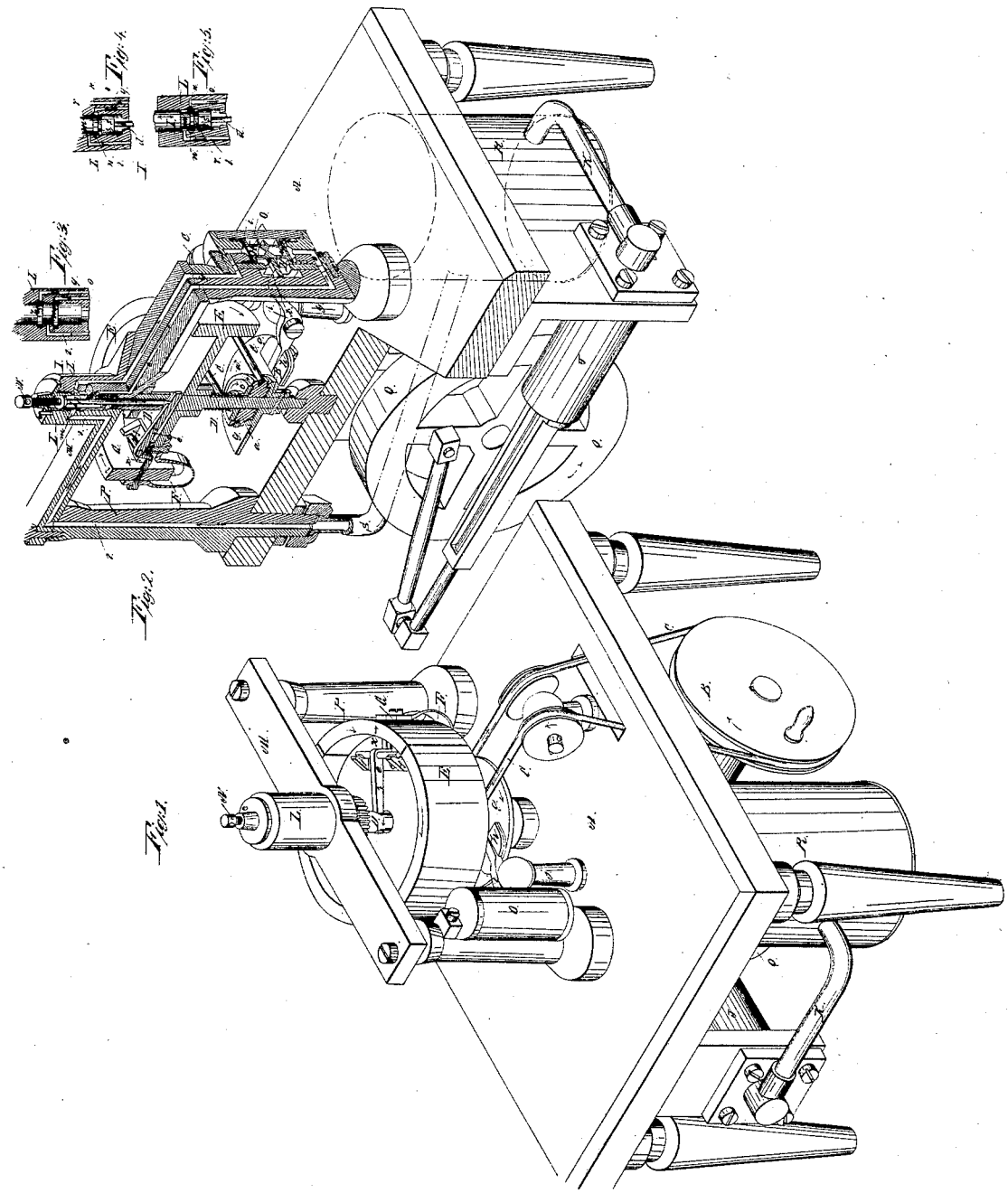
G. M. Phelps,
Speed Governor.
Nº 18,927.
Patented Dec. 22, 1857.

GEO. M. PHELPS, OF TROY, NEW YORK.

GOVERNOR FOR MACHINERY.

Specification of Letters Patent No. 18,927, dated December 22, 1857.

*To all whom it may concern:*

Be it known that I, GEORGE M. PHELPS, of the city of Troy, in the county of Rensselaer and State of New York, have invented a new and improved mode of making a centrifugal or other suitable speed governor regulate the rotary motion of a shaft with which the governor is positively driven; and I do hereby declare that the following is a full and exact description of the same, reference being had to the annexed drawings, making a part of this specification, in which—

Figure 1 is an isometrical projection of a centrifugal governor, arranged according to my improvement to make a revolving shaft driven by friction from a wheel turned by hand, run with uniform speed;—which shaft may give uniform motion to an astronomical telescope, electric telegraph instrument, or other light machinery; Fig. 2, an isometrical projection of a section of the same; and Figs. 3, 4, and 5, details.

The same letters refer to like parts in all the figures; and the arrows indicate the directions in which the parts move.

A is the table which supports all the parts.

B is the hand-wheel and C a band for driving the shaft D by the friction of the loose pulley, $a$, between the fast plate $b$ and yielding one, $c$, on said shaft. The pulley, $a$, is to be always driven faster than the standard uniform speed at which the shaft D is to run.

E is a balance wheel fast on the shaft D. A segment, G, of the rim of the balance wheel, is made movable, and is an equivalent for the radially moving ball or balls of the common centrifugal governor, — the segment being mounted on the spring F, fastened firmly to the balance wheel, so that whenever the segment flies outward or springs inward there is no friction in the parts which sustain the segment to impede even the most delicate centrifugal or centripetal movement thereof. The spring F presses the segment inward against stops $x$, $x'$, with such power that the centrifugal force of the segment, when running at the required speed, is just sufficient to overcome that of the spring; and as the segment flies outward the power of the spring so increases, that, with every increase of speed in the shaft D the segment flies only a little farther outward. The segment gives endwise motion to the rod $d$, loose within the shaft, D, by means of the lever $e$ turning on bearings $f$, $f'$. The device employed in this case to lessen the speed of the shaft D whenever it becomes too fast, consists of the brake pad $h$, on the lever $i$, hung to the post $j$; so that by pressing up the end $k$ of that lever, the brake is pressed against the disk $g$ fast on the shaft D, and by pressing the end $k$ down the brake is lifted from the plate $g$. Now, the segment, G, does not by its own centrifugal power, press the brake-pad, $h$, against the plate $g$;—its force would be too feeble. But the segment G governs the application of the brake, by controlling, by means of the valve, I, mounted upon and moving with the rod, $d$, the motive action or pressure of a current of air pressing through the conduits, $l$, and $o$, $q$, in the direction of the arrows therein, upon the piston H arranged within the cylinder O, to work the brake lever $i$.

The current of air is produced by a force pump, J, worked from the balance wheel, Q, fast on the shaft of the hand wheel, B;—which pump forces the air through the pipe K, receiver R, pipe S and tubular passage $l$ within the port P and cross bar M, to the valve I. The valve I is a cylinder working endwise in the hollow cylinder L, and has a broad annular groove, $m$, into which the air from the pump constantly presses. From this groove the air presses into the annular groove, $n$, in the cylinder L, and through the tubular passage $o$, against the end $u$, of the piston H, so as to press the brake against the plate $g$, whenever the segment G, flies outward, so as to lower or let down the valve, I, to its position in Fig. 2; and whenever the segment springs inward so as to raise the valve to its place in Fig. 4, the air then presses into the annular groove $p$ in the cylinder L and through the passage $q$ against the end $v$ of the piston, so as to lift the brake from the plate. The valve I is hollow; and its interior communicates freely with the open air. It has two grooves, $r$, and $t$, with holes, $s$, and $w$, leading into the interior of the valve. When the valve I lets the compressed air act against the end $u$ of the piston, the air at the other end of the piston at the same time escapes through the groove $t$ and holes $w$ into the open interior of the valve, as seen by Fig. 2; and when the valve is moved by the segment so as to let the condensed air press against the end $v$ of the piston the air at the other end, $u$, then escapes through the annular groove $r$ and holes $s$, as shown by Fig. 4.

Instead of making the piston H and valve I double acting, the valve may be made as in Fig. 5 so as to let the compressed air act only against one end of the piston, to press the pad $h$ against the plate $g$, the pad constantly resting on the plate, or, being lifted therefrom, when the piston stops pressing, by a spring or weight. The construction of the valve I is not new; and many other kinds of valves may be used in its stead; but I prefer to use that valve in regulating light machinery, on account of its sensitiveness; for it can be and is made so accurate that it requires to be moved no more than the $\frac{1}{100}$ of an inch to control the action of the air on the piston, and the pressure of the current of air does not alter the freedom of its movements. The segment G occupies a certain exact uniform position radially whenever the shaft D is running at the exact standard speed, and the valve I is so adjusted on the rod $d$ that the brake shall be applied whenever the speed of the shaft D has increased enough above the standard rate to make the centrifugal force of the governor move the valve the minute distance required to let the compressed air act on the piston. Hence, if the valve is moved endwise by the segment G five times as far as that segment moves radially, any increase in the speed of the shaft D sufficient to make the segment G fly outward the $\frac{1}{500}$ of an inch beyond the place it occupies at the standard rate, will be directly corrected by the application of the brake $h$. By changing the position of the valve I on the rod $d$, as by turning the screw N, the shaft D may be run with uniform speed at different velocities; and by this means, or by making the spring F of adjustable strength, two separate machines, with a governor to each, can be easily adjusted so as to run with almost exactly the same rapid uniform motion.

Instead of using a current of atmospheric air to work the piston H, some other gaseous fluid may of course be employed; and the current of air or other fluid used may be produced or supplied by or from any other sufficient means or source than the pump J. And instead of using the cylinder and piston, O H, a simple expansible air chamber or other like deivce may be employed to develop the motive power of the current of air or other fluid used.

Although my improvement is applicable to several kinds of speed governors,—as to the revolving fan governor, whether running in air, water, or other fluid, and to some chronometric and differential governors,—still I generally prefer to use the centrifugal governor shown; and the illustration herein given of the application of my improvement thereto, will enable persons skilled in making such contrivances to use the other kinds; for in every case, that part of the governor which owes its movements to changes in the speed of the governor and shaft to be regulated, is, by a direct mechanical connection, made to move the valve, I, or an equivalent one, so as to control the motive action of the current of air or other fluid upon the piston, H, or its equivalent, arranged to work the friction brake $h$, or its equivalent mechanical device, which immediately changes the speed of the shaft to be regulated.

The shaft D, whose speed is to be regulated, may be driven by any sufficient motive power; as by a steam, hydraulic, or electro-magnetic engine, or a wind or water wheel, or by the generally more suitable means of the power of springs or descending weights or of man or animals developed by means of the mechanical agencies usually employed to obtain rotary motion therefrom. If the friction brake is applied to the shaft D with sufficient force to overcome the whole power of the prime motor, such driving mechanism may be positively geared with the said shaft; otherwise the shaft must be driven through some mechanical device,—similar to the friction pulley $a$, which will yield or slip when the friction brake is applied. If the shaft D is, independently of the friction brake $h$, subjected to resistances which will overcome the pulley $a$ or the driving power occasionally, an auxiliary friction wheel or roller,—not shown in the drawings,—should be arranged and revolved upon the lever $i$ in such manner that when the brake, $h$, is lifted from the plate $g$ by the piston H, the said friction wheel shall at the same time and by the same means be pressed against the under side of the plate $g$ so as to then accelerate the speed of the shaft D. When the usual driving power is always insufficient to overcome the ordinary working resistance offered to that shaft, the brake $h$ should then be dispensed with, and the said accelerating roller alone used. In such latter case the shaft D may be driven by the accelerating roller alone, controlled in its application thereto by the piston H. A revolving clutch or running band may be substituted for the said accelerating wheel or roller. For running mechanically-synchronous telegraph machines,—like "Hughes's," for which purpose this governing mechanism is more particularly designed,—I generally prefer to drive the shaft D and regulate its speed in the precise manner shown in the drawings, but the modes just named are substantially the same and may be used with success.

From the preceding description of my improved governing mechanism for regulating the rotary motion of a shaft driven by any sufficient power whatever, it will be seen to consist, essentially, of the described speed governor or an equivalent one, a pneumatic apparatus for producing a current of air or other fluid and developing and controlling its motive power, and the mechanical device which is arranged to directly change the speed of the shaft to be regulated; the three being so combined that the speed governor controls by a valve the motive action of the current of air or other fluid, upon the mechanical device by which the speed of the governor and shaft to be regulated is immediately changed as described. By this combination of contrivances I am enabled to obtain a more nearly uniform rotary motion in a shaft driven rapidly and subjected to great abrupt changes of resistance than I am aware of having been secured by means of any other mechanism not embracing an electro-magnetic device.

Now, it is not new to make a speed governor, by its own power, apply a friction-brake to a shaft with which the governor is positively driven, for the purpose of regulating the speed of said shaft. It is impossible to regulate by that method a shaft which is subjected to great changes of resistance with any tolerable degree of uniformity of speed when compared with that attained by my described mode. It is not new to simply apply a friction brake to a revolving wheel or shaft by means of the motive power of a current of air or other fluid developed by the use of a piston. The brakes of railroad cars have been operated in that manner.

The use of a speed governor merely as the dispenser of a power which controls the motive power is not new.

It is not new to regulate the speed of a steam engine by making a speed governor, driven by the engine, control, by means of a valve, the motive action of a current of steam, air, or other fluid upon a piston arranged to work the throttle, regulating, or cut off valve, which controls the supply of steam to the large working piston of the engine. Such a mode is described in Armengaud's publication *Industrielle*, Vol. 8, plate 27, and also in the specification of Child and Wilson's English Patent, No. 2408, dated Oct. 19, 1853, and is essentially different from my described method. To regulate the motion of a single shaft by Child and Wilson's or Bourdon's method, I believe necessarily requires the said shaft to be driven by a steam, air, or hydraulic engine, and the speed of the engine to be regulated with that of the shaft. But my method allows the shaft whose speed is to be regulated to be driven by any sufficient motive power whatever; and regulates the speed of the said shaft without necessarily controlling the speed of the motor which drives it. Child and Wilson, and Bourdon control the supply of steam or other fluid which works the engine, and by that means alone regulate the speed of the shaft driven thereby. But in regulating by my mode the speed of a shaft driven by a steam engine, I do not in any way control the supply of steam to the latter. It is essential to my mode that the speed of the shaft to be regulated should be changed by the application thereto of a mechanical device substantially such as described; but neither Child and Wilson nor Bourdon apply a friction brake or like mechanical device to retard or accelerate the speed of the engine or shaft to be regulated.

What I claim as my invention and desire to secure by Letters Patent is—

Causing the described centrifugal governor, or its equivalent, to regulate the rotary motion of a shaft with which the governor is positively driven, by making the governor control, by means of a valve, the motive action of a current of air or other gaseous fluid upon a piston or an analogous device arranged to work the mechanical contrivance by which the speed of the said shaft to be regulated is immediately changed, substantially as herein set forth.

GEORGE M. PHELPS.

Witnesses:
AUSTIN F. POST,
JOHN MORAN.